United States Patent
Nakamura et al.

(10) Patent No.: US 10,464,353 B2
(45) Date of Patent: Nov. 5, 2019

(54) PRINTING APPARATUS AND ADJUSTING METHOD

(71) Applicant: CANON KABUSHIKI KAISHA, Tokyo (JP)

(72) Inventors: Takashi Nakamura, Yokohama (JP); Akitoshi Yamada, Yokohama (JP); Kentaro Yano, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/902,469

(22) Filed: Feb. 22, 2018

(65) Prior Publication Data

US 2018/0244083 A1    Aug. 30, 2018

(30) Foreign Application Priority Data

Feb. 27, 2017  (JP) ................. 2017-035392

(51) Int. Cl.
| | |
|---|---|
| *B41J 13/08* | (2006.01) |
| *B41J 19/14* | (2006.01) |
| *B41J 11/00* | (2006.01) |
| *B41J 2/21* | (2006.01) |
| *B41J 13/03* | (2006.01) |
| *B41J 2/51* | (2006.01) |
| *B41J 13/00* | (2006.01) |
| *G06K 15/02* | (2006.01) |
| *G06K 15/10* | (2006.01) |

(52) U.S. Cl.
CPC ............. *B41J 13/08* (2013.01); *B41J 2/2132* (2013.01); *B41J 2/2135* (2013.01); *B41J 2/51* (2013.01); *B41J 11/008* (2013.01); *B41J 13/0027* (2013.01); *B41J 13/03* (2013.01); *B41J 19/142* (2013.01); *G06K 15/027* (2013.01); *G06K 15/102* (2013.01)

(58) Field of Classification Search
CPC ...... B41J 13/08; B41J 2/2135; B41J 13/0027; B41J 2/51; B41J 11/008; B41J 13/03; B41J 2/2132; B41J 19/142; G06K 15/027; G06K 15/102

See application file for complete search history.

(56) References Cited

U.S. PATENT DOCUMENTS 6,404,507 B1    6/2002  Hamamoto
8,136,903 B2 *  3/2012  Kunihiro ................ B41J 2/2132
                                                      347/12

OTHER PUBLICATIONS

IP.com search (Year: 2019).*

* cited by examiner

*Primary Examiner* — Lisa Solomon
(74) *Attorney, Agent, or Firm* — Canon U.S.A., Inc. IP Division

(57) ABSTRACT

A printing apparatus including a plurality of printing units along one guide can read test patterns printed with a plurality of types of conveying amount of a recording medium and determine a conveying amount based on the reading result.

13 Claims, 11 Drawing Sheets

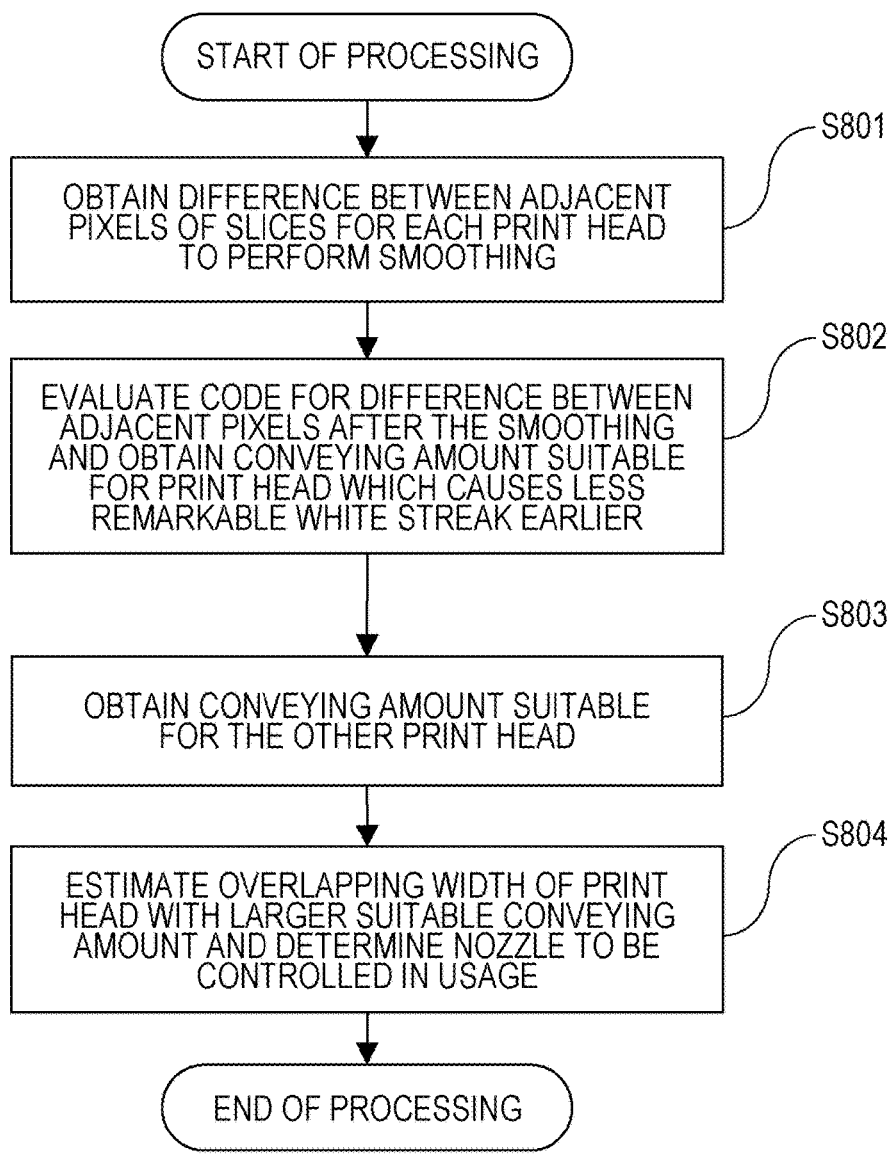

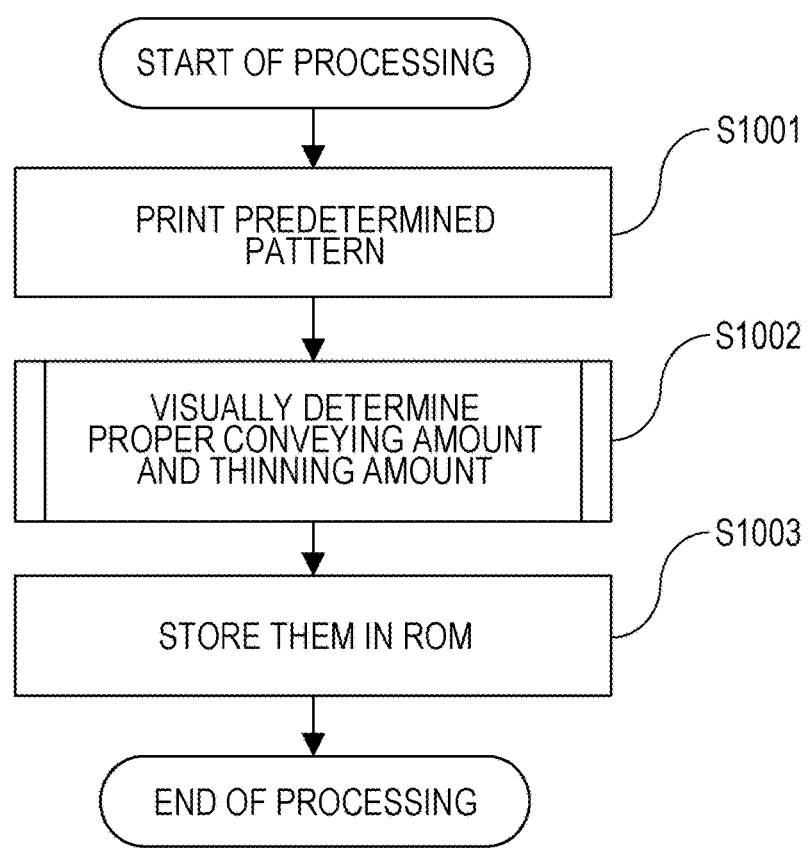

PRINTING APPARATUS AND ADJUSTING METHOD

BACKGROUND

Field of the Disclosure

The present disclosure relates to a printing apparatus for printing an image on a recording medium and an adjusting method for the printing apparatus.

Description of the Related Art

An ink-jet printer has been widely spread as an apparatus for printing on a recording medium an image such as text and color images transferred from a host computer. An ink-jet printing technology has been increasingly applied for printers and copy machines, for example. With this, there is an increased need for a high-speed ink-jet printing technology. With this, a higher speed ink-jet printing technology has been increasingly demanded.

A so-called serial scan ink-jet printer has been known which moves to the right and left a carriage including a print head having a plurality of printing elements for ejecting ink to print an image on a recording medium. While the carriage is moving or while the print head is ejecting ink, a recording medium is stopped without being conveyed. Then, while the carriage is stopped at one of the right and left ends, the recording medium is conveyed. The movement of the carriage and the conveyance of a recording medium may be repeated intermittently to print an image on the recording medium.

On the other hand, in such an ink-jet printer, high speed printing has been achieved mainly by increasing a printing width and a scanning speed for printing by one scan for reducing a printing time necessary for the scan. U.S. Pat. No. 6,404,507 proposes a printing method which divides and assigns a printing region to each of a plurality of printing units placed in parallel in order to increase the printing speed. More specifically, the ink-jet printer includes a left side printing unit configured to print a left side of a printing region and a right side printing unit configured to print a right side of the printing region. U.S. Pat. No. 6,404,507 further discloses that the ink-jet printer includes tanks for inks of colors of CMYK corresponding to the left side printing unit and tanks for inks of colors of CMYK corresponding to the right side printing unit separately from the tanks corresponding to the left side printing unit.

A conveying amount of a recording medium in a serial ink-jet printer may be determined in consideration of a plurality of factors. For example, the determination may consider a displacement of dot positions due to the fitting tolerances and the direction of ejection of ink droplets by printing elements manufactured by a manufacturing method including an exposure process based on a photolithography technology, for example. Here, image defects due to such a dot displacement can roughly be divided into two of a so-called "white streak" and "black streak". A region to be printed by using a print head by one scan will be called a "band". In a case where a dot displacement reduces the width of the band in a conveying direction of a recording medium more than expected or in a case where the position of the printed band is deviated from an expected position, a gap may occur between a band printed by one scan and a band printed by the next scan. A state that such a gap causes a reduced density of a printed image is called a "white streak". Also, in a case where dot displacement increases the width of a band in a conveying direction of a recording medium more than expected or in a case where the position of a printing band is deviated from an expected position, a band printed by one scan and a band printed by the next scan may overlap. A state that such a gap causes an increased density of a printed image is called a "black streak". These "white streak" and "black streak" may be caused by some combinations of a printer main body and a print head. Such streaks can be prevented from being easily visually recognized through adjustment of the conveying amount of a recording medium between bands.

Because two print heads are mounted in each of carriages in a serial printer having a plurality of print heads, an image is printed when the print heads move with the carriages. The plurality of carriages is configured to move along one guide. Therefore, though a proper conveying amount should be set for each of the plurality of print heads, the print heads are mounted on one guide, which may be difficult to fit to each of the characteristics of the print heads. In other words, adjusting the conveying amount to fit to a characteristic of one print head may cause a streak in a region printed by another print head for which the conveying amount is not adjusted.

SUMMARY

A printing apparatus includes a conveying unit configured to intermittently convey a recording medium in a conveying direction, a storage unit configured to store a conveying amount for conveying a recording medium by the conveying unit, a plurality of printing units having printing ranges having a predetermined width in the conveying direction and being capable of scanning in a scanning direction intersecting the conveying direction, the printing units are being spaced apart by a predetermined distance along one guide extending in the scanning direction, and a control unit configured to cause the plurality of printing units to print a pattern to be used for inhibiting a displacement between two regions printed by two scans of the plurality of printing units during one conveyance of a recording medium, to obtain conveying amounts of a recording medium for the plurality of printing units based on a reading result from the pattern, and to store in the storage unit one conveying amount of the obtained conveying amounts for the plurality of printing units as a conveying amount to be used for printing an image.

Further features of the present disclosure will become apparent from the following description of exemplary embodiments with reference to the attached drawings.

BRIEF DESCRIPTION OF THE DRAWINGS

FIG. 8 is a flowchart illustrating processing for determining a conveying amount according to one or more aspects of the present disclosure.

FIG. 10 is a flowchart illustrating processing for determining a conveying amount according to one or more aspects of the present disclosure.

DESCRIPTION OF THE EMBODIMENTS

First Embodiment

With reference to drawings, an embodiment of the present disclosure will be described. This embodiment is applicable to any serial printers including a plurality of image forming units irrespective of its printing systems such as an ink jet system, a thermal system, and a dot impact system. Hereinafter, the term "recording medium" refers to a sheet-shaped or a plate-shaped medium of paper, plastic, film, glass, ceramic, resin and so on. Hereinafter, the terms "upstream" and "downstream" refer to an upstream side and a downstream side, respectively, with reference to a conveying direction of a recording medium on which an image is to be printed.

Figure 1:
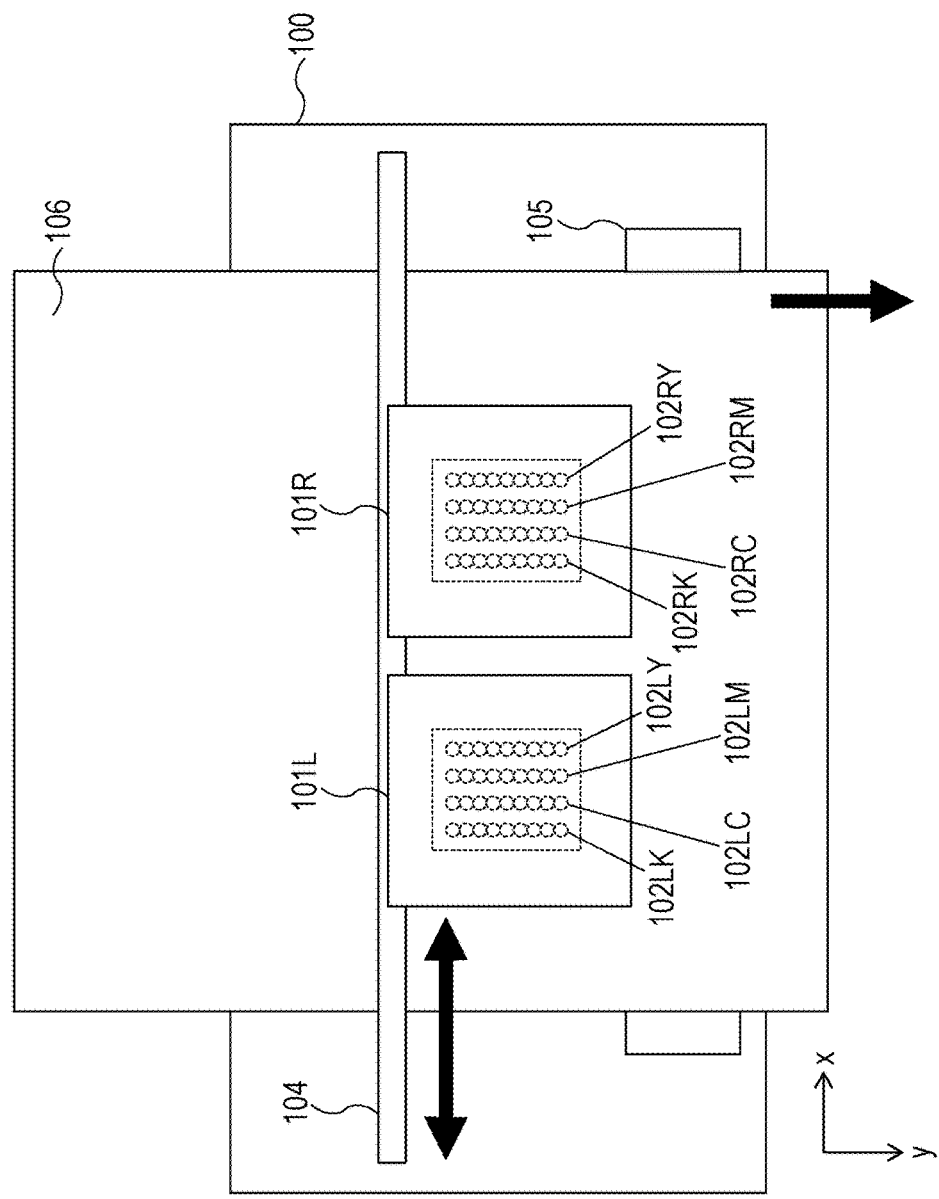
FIG. 1 is a schematic diagram illustrating an ink-jet printer according to one or more aspects of the present disclosure.

FIG. 1 schematically illustrates an ink-jet printer according to this embodiment. The ink-jet printer according to this embodiment is a printing apparatus which can print an image on a recording medium by using inks of a plurality of colors as recording agents. Here, a black (K) ink being an achromatic ink and cyan (C), magenta (M), and yellow (Y) inks being chromatic color inks are used. Referring to FIG. 1, a printer 100 includes two print heads corresponding to printing units on a frame forming a structural member of the printer. FIG. 1 Illustrates a left side print head 101L and a right side print head 101R. The print head 101L has a printing chip, and the printing chip includes printing elements configured to eject inks. The printing elements according to this embodiment are heating elements configured to heat an ink to foam by using a heating device such as heater so that the ink can be ejected through a nozzle. The printing chip has a nozzle array for each ink color such as a black nozzle array 102LK, a cyan nozzle array 102LC, a magenta nozzle array 102LM, and a yellow nozzle array 102LY. The print head 101R also includes a printing chip having printing elements configured to eject inks of the same colors as those of the inks ejectable from the print head 101L. The print head 101R has nozzle arrays including a black nozzle array 102RK, a cyan nozzle array 102RC, a magenta nozzle array 102RM, and a yellow nozzle array 102RY.

The printer 100 is a so-called serial printer. Each of the print head 101L and the print head 101R has a plurality of nozzles in a direction (Y direction in FIG. 1, called a sub-scanning direction, hereinafter) intersecting, by 90 degrees, a width direction (X direction, called a main scanning direction, hereinafter) of a recording sheet 106 being a recording medium. The print heads 101L and 101R are mounted on a guide 104 and are configured to scan along the guide 104. The two print heads according to this embodiment can scan on one guide normally by keeping a predetermined distance therebetween. Then, the print heads are reciprocally scanned in the X direction along the guide 104, and inks are ejected from the nozzles while the print heads are being reciprocally scanned so that an image can be printed on the recording sheet 106. The nozzle arrangement of the nozzle arrays has a resolution of 1200 dpi (dot per inch), and nozzles are arranged at intervals of $1/1200$ inches in the Y direction.

The recording sheet 106 is conveyed in the Y direction. The recording sheet 106 is conveyed by a conveying roller 105 (and other rollers, not illustrated) rotated by driving force of a motor (not illustrated). When the recording sheet 106 is fed, inks are ejected from the nozzles of the print head 101L and the print head 101R based on print data so that an image can be printed which has a width for one scan corresponding to the length of the nozzle arrays in the Y direction. After printing by one scan completes, the recording sheet 106 is conveyed by the width corresponding to the length of the nozzle arrays again so that the image of the width for one scan performed by the print heads is printed. The intermittent conveyance of a recording medium and the operation for discharging inks from the print heads are repeatedly performed to print an image on the recording medium.

Figure 2:
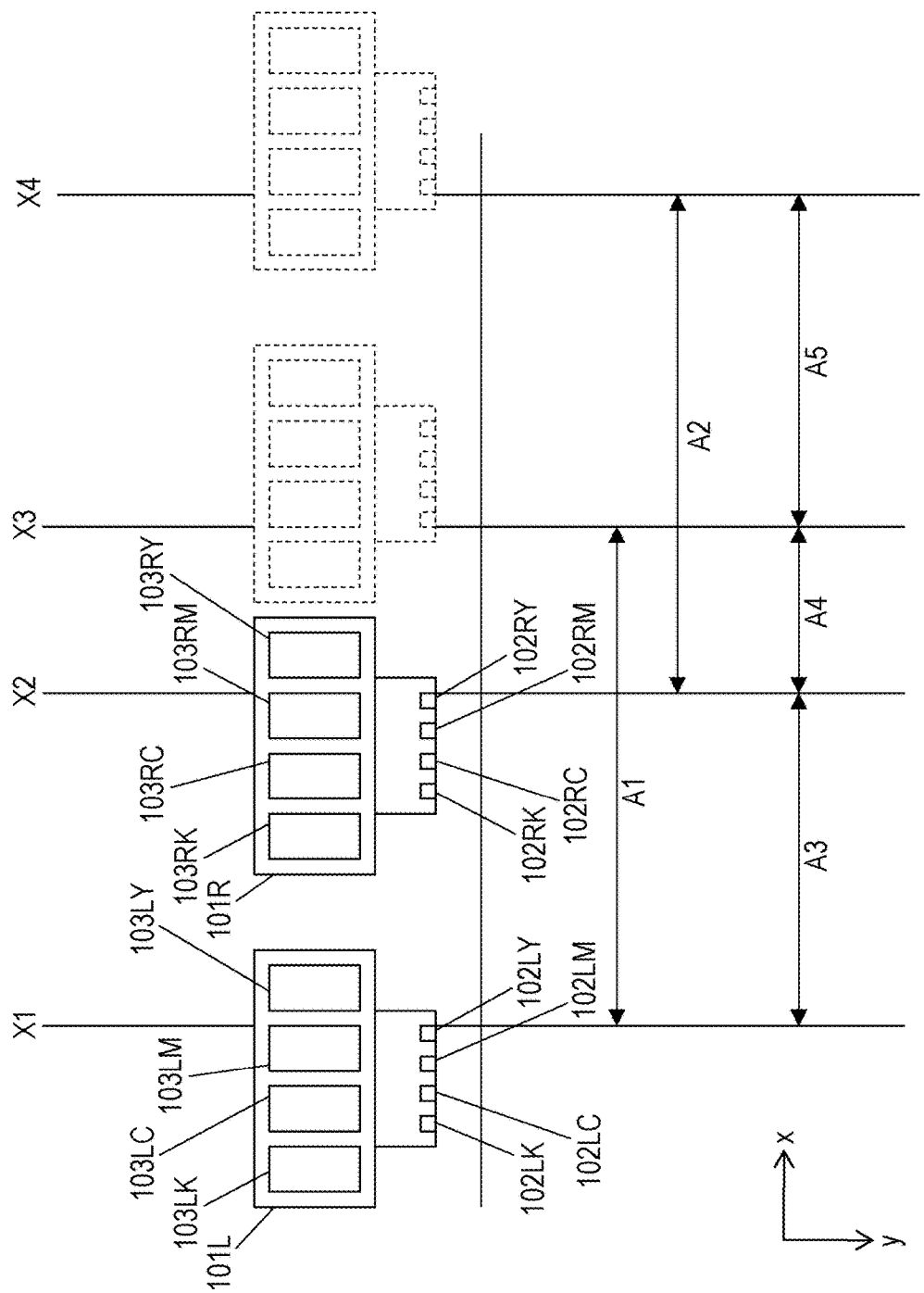
FIG. 2 is an explanatory diagram illustrating a plurality of print heads according to one or more aspects of the present disclosure.

FIG. 2 illustrates how the printer 100 illustrated in FIG. 1 uses the print head 101L and the print head 101R to form an image on the recording sheet 106. Because the print head 101L and the nozzle arrays 102LK, 102LC, 102LM, and 102LY and the print head 101R and the nozzle arrays 102RK, 102RC, 102RM, and 102RY in FIG. 2 are the same as those illustrated in FIG. 1, any repetitive description will be omitted. Ink tanks 103LK, 103LC, 103LM, and 103LY are provided in the print head 101L and are configured to store black, cyan, magenta, and yellow inks. The ink tanks storing inks are connected to nozzles of the corresponding colors and configured to supply the inks to the nozzles. Black, cyan, magenta, and yellow ink tanks 103RK, 103RC, 103RM, and 103RY, respectively, are provided in the print head 101R. The ink tanks for inks of four colors of black, cyan, magenta, and yellow are integrated according to this embodiment, and one integrated ink tank is provided in each of the right and left print heads.

FIG. 2 illustrates straight lines X1, X2, X3, and X4 representing positions in the main scanning direction (X direction) of the print heads on a surface of the recording sheet 106. The ink-jet printer according to this embodiment divides and assigns a region on a recording medium to the print head 101L and the print head 101R for printing. The straight line X1 indicates a left end of a region printable by the print head 101L, the straight line X2 indicates a left end of a region printable by the print head 101R, the straight line X3 indicates a right end of the region printable by the print head 101L, and the straight line X4 indicates a right end of the region printable by the print head 101R. FIG. 2 illustrates regions A1 and A2 representing regions in the X direction on a surface of the recording sheet 106. The region A1 is a first region printable by using the print head 101L, and the region A2 is a second region printable by using the print head 101R. A region A3 is printable by using the print head 101L only, and a region A5 is printable by using the print head 101R only. A region A4 is adjacent to the region A3 and the region A5 and is printable by using both of the print head 101L and the print head 101R. The region A4 is called an overlapped region herein. Therefore, the region A1 includes the region A3 and the region A4, and the region A2 includes the region A4 and the region A5.

Printing may be performed on the region A4 by one of the following three example methods. (1) The 50% of the print head 101L and the print head 101R may be used for printing. (2) The print head 101L may be used to print a left side of a predetermined X position in the region A4, and the print head 101R may be used to print a right side of the X position. (3) The printing rate is changed in stepwise manner for printing such that the usage of the print head 101L increases for printing as the distance to X2 being a left end of the region A4 increases and that the usage of the print head 101R increases for printing as the distance to X3 being a right end of the region A4 increases. The present disclosure may use one of these methods.

Figure 3:
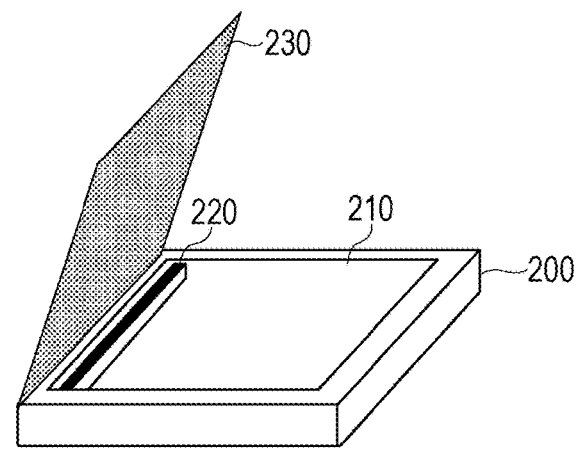
FIG. 3 is a schematic diagram illustrating a scanner according to one or more aspects of the present disclosure.

FIG. 3 schematically illustrates a scanner according to this embodiment. The scanner illustrated in FIG. 3 may be a so-called ink-jet MFP printer constituting one system together with the printer illustrated in FIG. 1 or may be provided externally to the printer. A housing 200 constitutes a scanner main body. A document platen 210 is a transparent member attached to cover the housing 200. The housing 200 and the document platen 210 constitute a tightly closed space. A sensor 220 is configured to read a document, not illustrated, placed on the document platen 210 to obtain luminance signal values of pixels. A document, not illustrated, is sandwiched between a pressing plate 230 and the document platen 210. The sensor 220 may be a contact image sensor (CIS) or may be a contracting optical image sensor. The sensor may be belt-driven or may be self-driven. The scanner 200 includes a signal output unit, not illustrated. The signal output unit is connectable to the printer main body internally if the printer is ink-jet MFP, for example, in a wired or wireless manner. Otherwise, the signal output unit may be connected to the printer main body externally in a wired or wireless manner or may be connected thereto through a personal computer.

Figure 4:
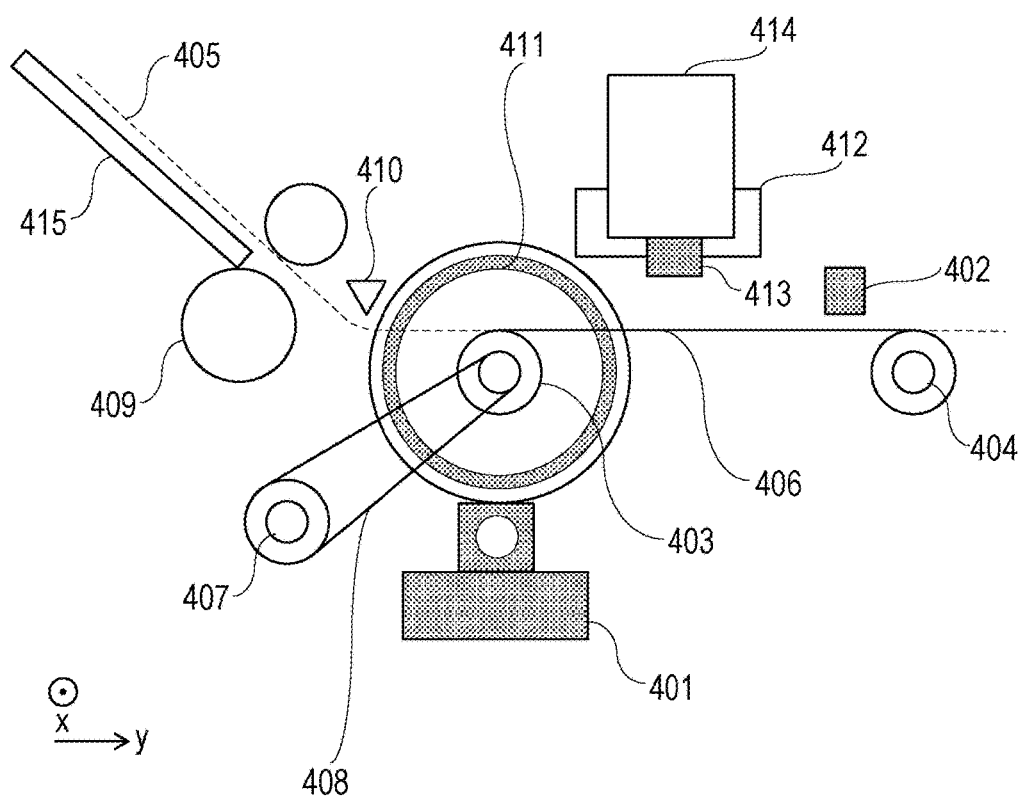
FIG. 4 is a cross sectional view illustrating a configuration of a main part of the printer according to one or more aspects of the present disclosure.

FIG. 4 is a cross sectional view illustrating a configuration of a main part of the printer 100. The printer 100 has a conveying mechanism configured to move a recording medium in the sub-scanning direction by using a roller conveyance system and a printing mechanism configured to print an image by ejecting ink from the print heads to a recording medium conveyed thereto. The printer 100 further has a rotary encoder 401 (also called rotation angle sensor) configured to indirectly detect a movement state of an object and a direct sensor 402 configured to directly detect a movement state of an object. The conveying mechanism has a first roller 403 and a second 404 being rotators. The recording medium 405 is conveyed along a surface of a platen 406. A turning force of the conveying motor 407 being a driving source for conveying a recording medium is transmitted to the first roller 403 being a driving roller through a drive belt 408 so that the first roller 403 rotates. The conveying mechanism further has a feeding roller 409 and a feed motor (not illustrated) configured to drive the feeding roller 409. The feeding roller 409 is configured to feed the recording medium 405 loaded on a tray 415 one by one separately onto the platen 406. A paper end sensor 410 downstream of the feed motor is configured to detect a leading edge or a trailing edge of a recording medium to obtain a time for conveying the recording medium. A rotary encoder 401 is configured to detect a rotation state of the first roller 403. The rotary encoder 401 has a photo-interrupter and is configured to optically read slits equally spaced on a circumference of a code wheel 411 coaxially attached to the first roller 403 and generate a pulse signal. The direct sensor 402 is installed downstream of the platen 406 in the conveying direction of a recording medium and includes an image sensor (image capturing device) configured to capture an image of the recording medium 405 conveyed on the platen 406. The direct sensor 402 is configured to directly detect a recording state of the recording medium 405. The printing mechanism has carriages 412 configured to reciprocally move in the main scanning direction and print heads 413 and ink tanks 414 mounted on the carriages 412. The carriages 412 reciprocally move in the main scanning direction with a driving force of a main scanning motor (not illustrated) and eject ink from nozzles of the print heads 413 in synchronism with the movement to print an image on the recording medium 405. The print heads 413 and the ink tanks 414 which are integrated to each other may be detachably attached to the carriages 412, or the print heads 413 and the ink tanks 414 which are separated from each other may be detachably attached to the carriages 412. The print head 413 according to this embodiment is an ink jet system configured to eject ink by using a heating element, as described above but may apply a system using a piezoelectric device, a system having an electrostatic element, or a system using an MEMS element, for example. The conveying mechanism is not limited to a belt conveyance system but may have a mechanism which transmits a drive of the conveying roller by using the conveying belt directly to a recording medium according to a modification example. FIG. 4 is a cross sectional view illustrating one carriage 412, one print head 413 and one ink tank 414 (hereinafter, called "carriage system") only. This embodiment is a printer including a plurality of print heads mounted in a plurality of carriages, and the other carriage systems, not illustrated, also basically have the same configuration.

Figure 5:
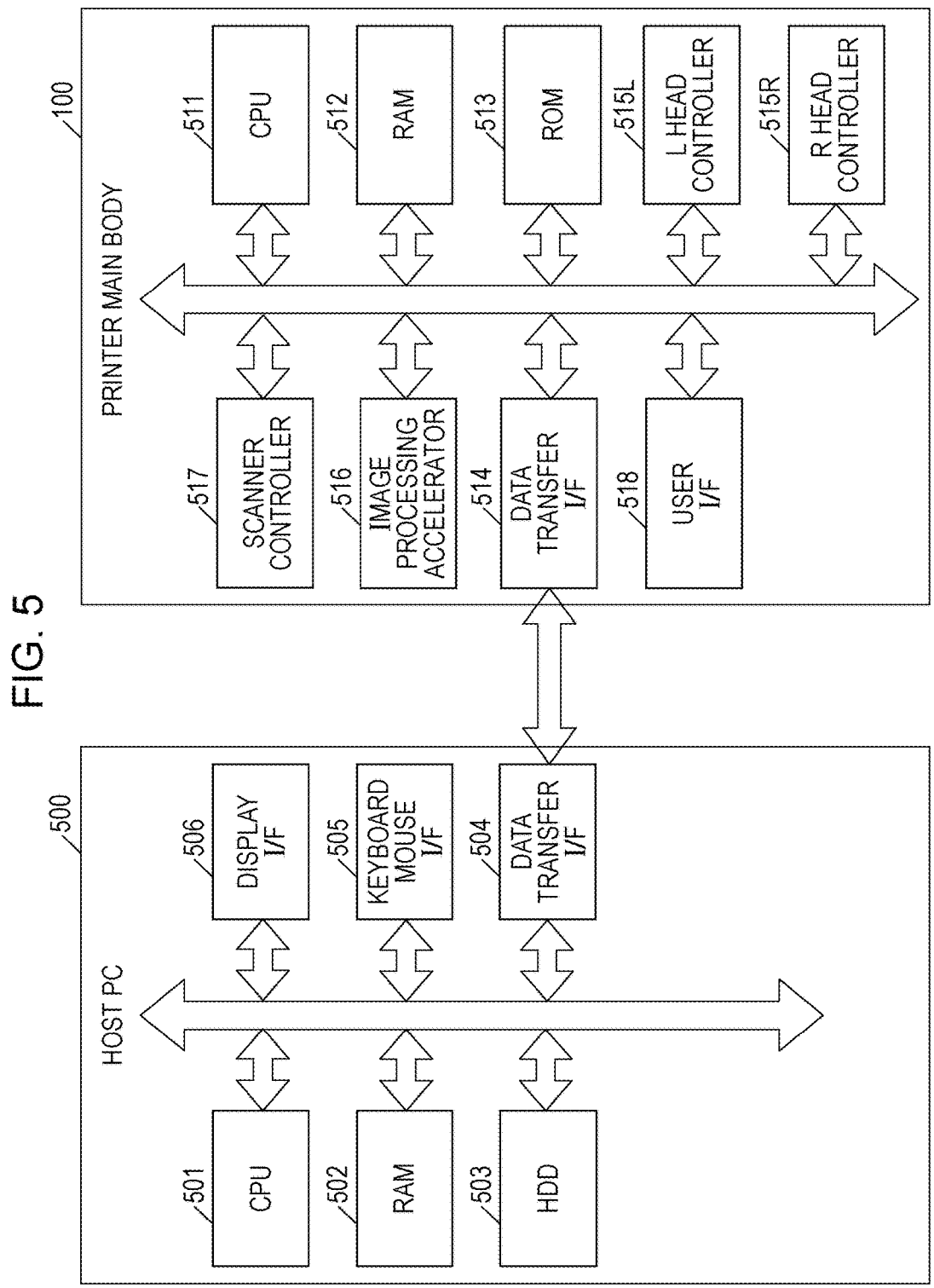
FIG. 5 is a block diagram illustrating a configuration example of a printing system according to one or more aspects of the present disclosure.

FIG. 5 is a block diagram illustrating a configuration example of a printing system according to this embodiment of the present disclosure. As illustrated in FIG. 5, the printing system includes the printer 100 corresponding to the printing apparatus illustrated FIG. 1 and a personal computer (PC) 500 corresponding to the host apparatus therein.

The host PC 500 mainly has the following elements. A CPU 501 is configured to execute processes based on programs held in an HDD 503 and a RAM 502. The RAM 502 is a volatile storage and is configured to temporarily hold a program and data. The HDD 503 is a nonvolatile storage and is configured to hold a program and data. A data transfer interface (I/F) 504 is configured to control transmission and reception of data to and from the printer 100. The data transmission/reception may be performed through a connection system such as a USB, an IEEE 1394, and a LAN. A keyboard/mouse I/F 505 is an interface configured to control an HID (Human Interface Device) such as a keyboard and a mouse, and a user can input through the I/F. A display device I/F 506 is configured to control display on a display device (not illustrated).

On the other hand, the printer 100 mainly includes the following elements. The CPU 511 may execute processes, which will be described below with reference to FIG. 6 and subsequent figures, based on programs held in a ROM 513 and a RAM 512. The RAM 512 is a volatile storage and is configured to temporarily hold a program and data. The ROM 513 is a non-volatile storage and functions as a storage unit configured to hold parameters and programs generated by the processes which will be described below with reference to FIG. 6 and subsequent figures. The ROM 513 according to this embodiment is a writable and erasable memory such as an EPROM and an EEPROM.

A data transfer I/F 514 is configured to control transmission and reception of data to and from the PC 500. A head controller 515L is configured to supply print data to the print head 101L illustrated in FIG. 1 and to control ejection operations performed by the print head 101L. More specifically, the head controller 515L may be configured to read control parameters and print data from a predetermined address in the RAM 512. The CPU 511 is configured to write a control parameter and to print data at the predetermined address in the RAM 512. A process is activated by the head controller 515L, and ink is ejected from the print head 101L. The head controller 515R is also configured to supply print data to the print head 101R illustrated in FIG. 1 and to control an ejection operation performed by the print head 101R. An image processing accelerator 516 is configured by hardware and is configured to execute image processing at higher speed that that of the CPU 511. More specifically, the image processing accelerator 516 may be configured to read parameter data to be used for image processing from a predetermined address in the RAM 512. When the CPU 511 writes the parameter and data to the predetermined address in the RAM 512, the image processing accelerator 516 is activated to perform a predetermined image process. The image processing accelerator 516 may not be a required element. The CPU 511 may perform processing to generate a table parameter as described above and execute an image process based on the specifications of the printer. A user interface 518 is configured to receive a result regarding a printed test pattern input from a user.

Figure 6:
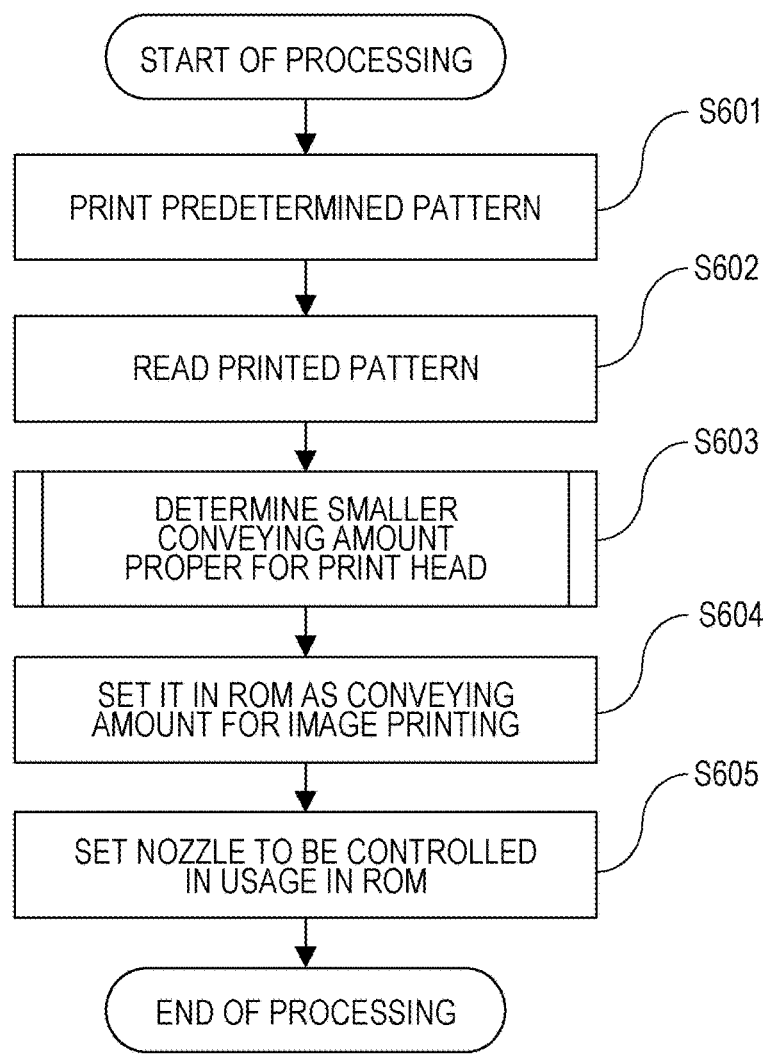
FIG. 6 is a flowchart illustrating processing for determining a conveying amount according to one or more aspects of the present disclosure.
Figure 7:
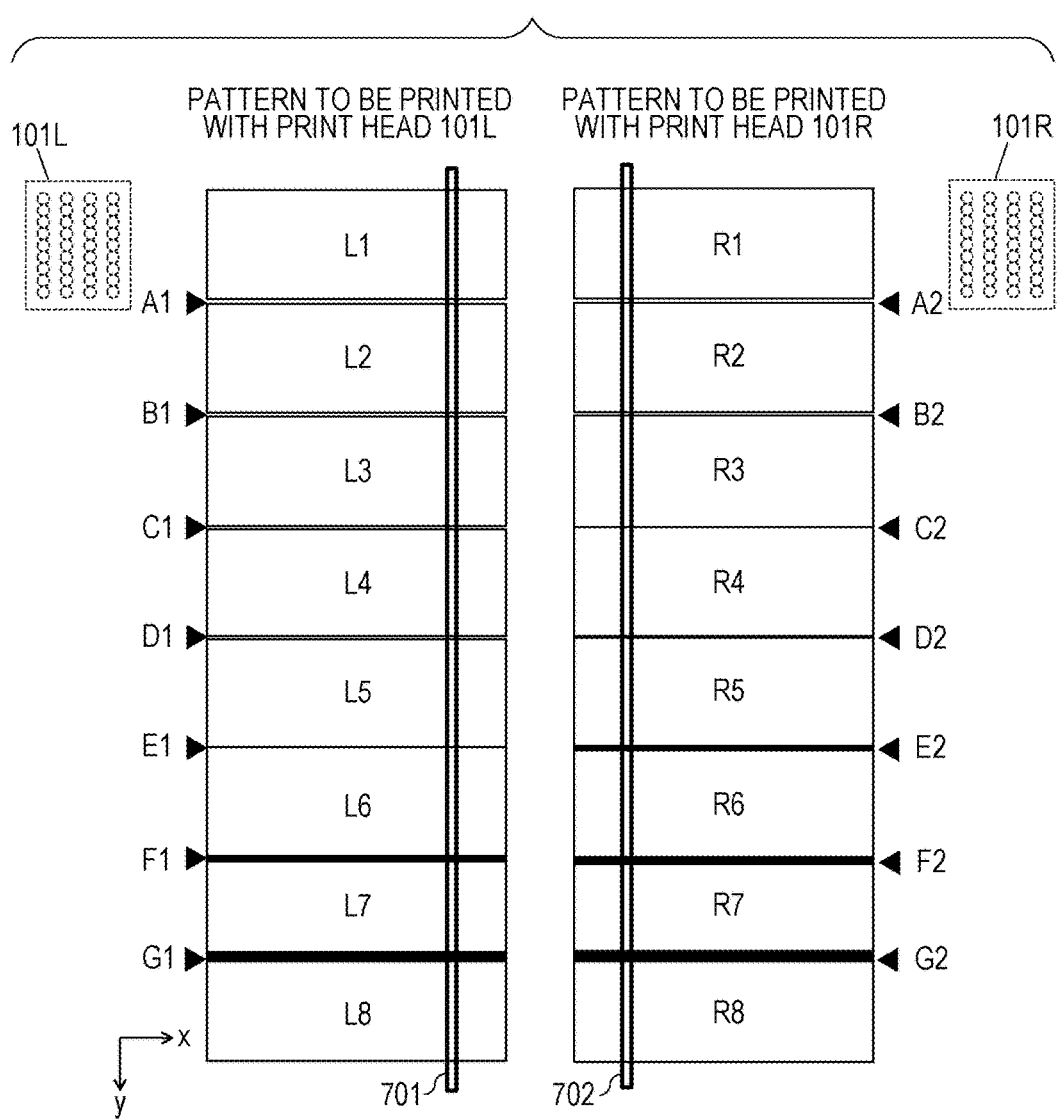
FIG. 7 is an explanatory diagram illustrating a test pattern according to one or more aspects of the present disclosure.

FIG. 6 is a flowchart illustrating distinctive processing according to this embodiment. First, in step S601, a predetermined pattern image is printed as illustrated in FIG. 7. The pattern image is printed by using both of the print head 101L and the print head 101R in FIG. 1 and is used for preventing the print heads from being displaced between two regions printed by predetermined two scans. The ranges on which the pattern is to be printed may be a region A1 and a region A2 or regions A3 to A5 in FIG. 2. FIG. 7 illustrates an example in which the test pattern is to be printed on a part of the region A3 assigned to the print head 101L and a part of the region A5 assigned to the print head 101R. Referring to FIG. 7, left regions L1 to L8 are assigned to the print head 101L, and right regions R1 to R8 are assigned to the print head 101R. The regions are printed by one scan of the print heads. Here, a width printable by one scan of any one of the print head in the conveying direction will be called a bandwidth. One scan of the carriage system implements printing on the region L1 and the region R1, and a predetermined amount of a recording medium is then conveyed. The conveying amount will be described in detail below. Another scan of the carriage system then implements printing on the region L2 and region R2. In this manner, intermittently repeating the conveyance of a recording medium and the scan of the carriage system implements printing on the region L8 and the region R8. The ink to be used for printing the test pattern is not limited here. Chromatic color ink or achromatic color ink may be used. In a case where the lengths of nozzles depend on ink colors and therefore the resulting printable widths differ, the following correction is to be performed for all of colors causing different bandwidths. In a case where a plurality of colors has an equal printable width, all of the ink colors or a monochromatic ink may be used for printing a test pattern. For simplicity, the following descriptions assume a system in which nozzles corresponding to all of ink colors have an equal nozzle length or produce an equal bandwidth. It is also assumed that a test pattern in one color may be used for all of corrections. A method for sequentially changing the conveying amount will be described below. The resolution and the amount of droplets may be set properly in accordance with the assumed printer. A recording medium is conveyed upon completion of ejection of a predetermined amount and printing thereof. Referring to FIG. 7, overlap portions A1 to G1 and A2 to G2 position at boundaries between regions to be printed by two scans crossing the portions.

Next, the conveying amount will be described. The conveying amount originally should be an amount corresponding to a length printable by one scan of a carriage system in the conveying direction of a recording medium. In general, a printable range of a print head is equal to the length of a printing element array, which is called a nozzle width. Here, one print head has a nozzle width d. The conveying amount can be controlled based on the rotation angle of the code wheel 411. The rotation angle of the code wheel 411 can be determined by counting minute slits given on the code wheel. Based on the determined rotation angle, the conveying amount can be determined. Thus, the conveying amount can be controlled by counting the slits of the code wheel. Therefore, the encoder 401 associates the slit count and the rotation amount of the conveying motor. Here, for example, the first roller 403 is to be rotated to obtain a relationship $2n \times (d/2\pi R) = d/R$ [rad] and to convey a recording medium by an amount equal to the nozzle width d where the code wheel 411 has a radius R. However, due to tolerances in manufacturing of print heads and a displacement of the direction of ejection of ink droplets from a printing element, the conveying amount of a recording material for the print heads may not be equal to the nozzle width d. Against this problem, minute adjustment may be performed on the conveying amount. According to this embodiment, a pattern is printed with a plurality of different conveying amounts, and a conveying amount proper for a print head is selected from the different conveying amounts. First, a reference conveyance amount and an adjustment amount to be added to or subtracted from the amount are defined, and patterns may be printed for a plurality of different conveying amounts. According to this embodiment, the reference conveyance amount is set to be equal to the nozzle width d, that is, a reference rotation angle is set to be equal to d/R [rad]. When a conveying amount step to be added or to be subtracted is equal to $\delta$, a rotation width step is equal to S/R [rad]. $\delta$ may be determined properly in accordance with an assumed system or device. A recording medium is conveyed by conveying amounts in decreasing order before and after two scans of the carriage system. First, a predetermined amount of ink is ejected during one scan of the carriage system, and the print head 101L is used to print the region L1 while the print head 101R is used to print the region R1. Next, the code wheel 411 is rotated by $(d+3\delta)/R$ [rad] such that the conveying amount can be equal to $d+3\delta$. Then, the predetermined amount of ink is ejected, and the print head 101L is used to print the region L2 while the print head 101R is used to print the region R2. Next, the code wheel 411 is in turn rotated by $(d+2\delta)/R$ [rad] such that the conveying amount can be equal to $d+2\delta$. After the scan and conveyance are repeated and the conveyance by $d-3\delta$ completes, the carriage system is scanned to print the region L8 and region R8. The, the printing of the test patterns ends. Thus, the test patterns can be printed with a plurality of different widths of the overlap portion A1 to G1 and A2 to G2 between the regions.

Next, in step S602, the scanner in FIG. 3 is used to read luminance signal values of the printed test patterns illustrated in FIG. 7 and to obtain the reading results. The scanner may have a resolution enough for resolving δ, and the reading results may be data read at a resolution of 600 dpi.

Next, in step S603, based on the reading results, conveying amounts proper for both of the print head 101L and the print head 101R are obtained so that the smallest conveying amount can be determined. According to this embodiment, the smallest one of the conveying amounts for the print heads is determined as a conveying amount for printing an image in the printing apparatus. Furthermore, for the print head with the largest conveying amount, a nozzle to be restricted from being used for printing an image is determined. The processing in step S603 will be described with reference to the flowchart in FIG. 8.

The conveying amounts between regions are equal to d+3δ, d+2δ, d+δ, d, d−δ, d−2δ, d−3δ in order from top to bottom in the test patterns in FIG. 7, as described above, and the conveying amounts are gradually reduced. The overlap portions A1 to G1 and A2 to G2 between two regions are designed such that a white streak occurs which has gradually decreasing widths in the conveying direction of a recording medium. By attempting to find a position where the white streak no longer appears in order from the region with the largest conveying amount of a recording medium, a conveying amount with the smallest white streak and the smallest black streak can be determined as a conveying amount proper for the print head.

Figure 9A:
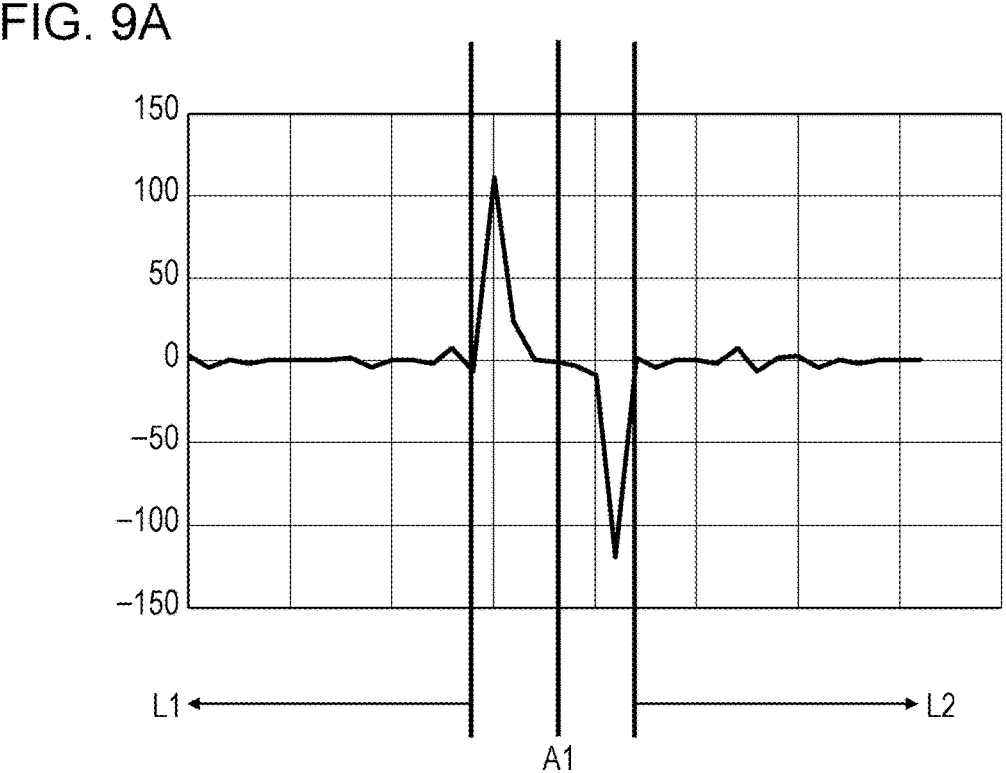
FIGS. 9A and 9B are graphs illustrating pixel values of a read test pattern according to one or more aspects of the present disclosure.
Figure 9B:
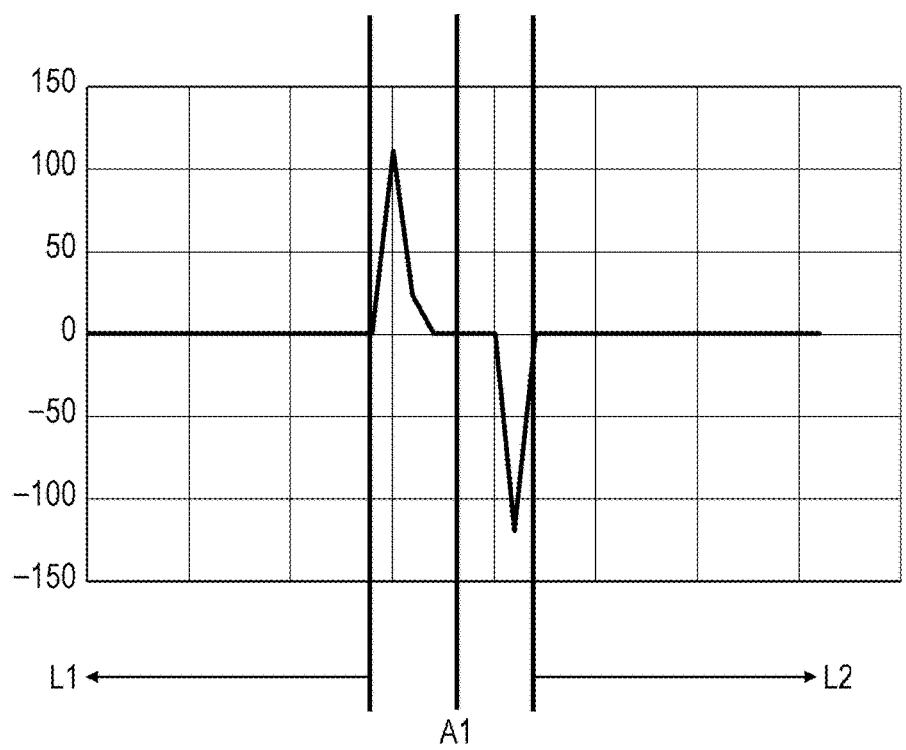

First, in step S801 in FIG. 8, a difference value between each pixel and a pixel adjoining the pixel of a slice 701 and a slice 702 included in the test pattern in FIG. 7 is obtained. FIG. 9A is a graph visualizing a difference value between each pixel and adjoining pixels in neighborhood of an overlap portion A1 between two regions of the region L1 and the region L2 in regions represented by the slice 701 in FIG. 7. The graph in FIG. 9A has a vertical axis indicating pixel difference Dn(n) and a horizontal axis indicating position of a pixel along a slice. A pixel difference value Dn(n) of the nth pixel is obtained by Dn(n)=Vn+1−Vn where Vn is an nth pixel value and Vn+1 is a (n+1)th pixel value. Because reading by a scanner involves minute vibration, smoothing processing is performed on the graph of Dn(n). FIG. 9B is a graph represented by Dns(n) obtained by performing the smoothing processing on Dn(n). According to one smoothing method, for example, Dns(n)=If(abs(D(n)<C, 0, D(n)) (where C is a parameter representing an arbitrary threshold value) may be defined where Dns(n) is a pixel difference value after the smoothing processing so that variations excluding a large variation can be equal to 0.

In step S802, the obtained Dns(n) is evaluated. In this case, a difference value from an adjoining pixel takes a value from 0 to a positive value, then a series of 0s and finally a value from 0 to a negative value. A position having a value from 0 to a positive value represents a transition from a dark part to a bright part. A region having 0s after that represents a region where the brightness does not vary. In other words, it can be estimated that the region has a transition from the region L1 to a recess within a white streak. Finally, a position having a value from 0 to a negative value represents a transition from a bright part to a dark part. In other words, the position has a transition from the white streak to the region L2. These sign changes are evaluated across the slices 701 and 702. Referring to the test patterns in FIG. 7, it can be regarded that the overlap portions A1 to G1 and A2 to G2 position every bandwidth printed by about one scan. Therefore, within the slice 701 or the slice 702, a next overlap portion can be expected at a pixel position advanced by an amount equivalent to the printing bandwidth from a pixel n having the first sign change. In this manner, a pixel difference in neighborhood of each of the overlap portions A1 to G1 and overlap portions A2 to G2 in order from the top. Thus, one of the region printed by the print head 101L and the region printed by the print head 101R can be determined which has less remarkable white streak (or small gap) earlier as the conveying amount decreases. Then, which one of the conveying amount proper for the print head 101L and the conveying amount proper for the print head 101R is larger is determined. Referring to the example in FIG. 7, the white streak becomes less remarkable earlier at the position of the overlap portion C2 in the slice 702. Therefore, a relatively larger conveying amount of a recording medium is proper for the print head 101R, while a relatively smaller conveying amount is proper for the print head 101L. The conveying amount proper for the print head 101R is equal to the conveying amount d+δ corresponding to the overlap portion C2.

In step S803, the patterns are evaluated continuously after step S802, and the position of an overlap portion in the slice 701 is determined where the sign change stops and where the white streak becomes less remarkable. Referring to the example in FIG. 7, at the position of the overlap portion E1 in the slice 701, the sign change stops, and the white streak is less remarkable. In other words, the conveying amount proper for the print head 101L is equal to the conveying amount d−δ corresponding to the overlap portion E1.

In step S804, a region corresponding to the overlap portion E2, that is an overlap width between the region R5 and the region R6 is estimated among the patterns printed by the print head 101R for which a relatively larger conveying amount of a recording medium is proper. The conveying amount d−δ corresponding to the overlap portions E1 and E2 is a proper conveying amount for the print head 101L but is too small for the print head 101R. This causes an overlapping region where a part of the region R5 and a part of the region R6 are overlapped and overprinting occurs. The width of the overlapping region can be determined based on the number of serial pixels between positions where the sign of the adjoining pixel difference value Dns(n) is inverted, and the density of the overlapping region can be determined based on a read luminance signal value. For simplicity, a nozzle to be restricted from being used for printing an image is determined based on the number of overlapping pixels and the reading resolution. By controlling the nozzle to be used based on the width and density of the overlapping region, the black streak caused by the overlapping can be made less remarkable. The nozzle to be restricted from being used may be a nozzle downstream in the conveying direction for the previous scan or may be a nozzle upstream in the conveying direction for the next scan. A nozzle downstream in the conveying direction for the previous scan may be used in combination with a nozzle upstream in the conveying direction for the next scan. The processing in step S603 in FIG. 6 has been described up to this point. Processing will be described with reference back to FIG. 6.

In step S604, the conveying amount adjusted for the print head for which a smaller conveying amount of a recording medium is proper, which is obtained in step S803, is determined as a conveying amount to be used for printing an image and is set in the ROM 513. In the example of this embodiment, the conveying amount d−δ proper for the print head 101L is determined as a conveying amount to be sued for printing an image and is stored in the ROM 513. In step S605, the nozzle to be restricted from being used, which is determined in step S804, is set and stored in the ROM 513. The processing then ends.

According to this embodiment, the conveying amount of a recording medium to be stored in the ROM 513 is equivalent to the value of the slit count of the code wheel. In order to print an image after the processing for determining a conveying amount of a recording medium ends, the slit count value set in the ROM 513 is read out so that the rotation amount of the conveying motor 407 can be controlled through a control circuit, not illustrated. As a result, the conveying amount can be controlled. At the same time, the nozzle is restricted from being used. In this case, the conveying amount adjusted for the print head for which a smaller conveying amount of a recording medium is proper is applied for image printing while the use of the nozzle is restricted in printing by using the other print head of the image. Thus, even in a case where a recording material is conveyed by a conveying amount smaller than the conveying amount proper for the print head, a less remarkable black streak occurs. A black streak can be made less remarkable by reducing the printing amount, by restricting designated partial nozzles not to be used, or by thinning a part of data to be printed by using the designated partial nozzles. One or more nozzles may be kept to be used in the print head for which a larger conveying amount is proper, instead of restriction of all nozzles corresponding to an overlapping region.

While the steps for adjustment of the conveying amount is equal to ±3 in the example in FIG. 7, a proper system may be configured in accordance with the width for printing an image, the length of the nozzle array of each of the print heads, the resolution of the scanner, and the minimum rotation angle of the rotary encoder, for example. According to this embodiment, the scanner illustrated in FIG. 3 is used to read the test patterns in FIG. 7. However, the direct sensor 402 in FIG. 4 may be used to print and read test patterns simultaneously.

This embodiment assumes a case where white streak or black streak occurs between printing bands due to different conveying amounts proper for the print head 101L and the print head 101R. The restriction or thinning processing on nozzles against black streak may not necessarily be performed. This is because, in general, white streak is remarkable while black streak is less remarkable on a printed image. In a case where overlap portions corresponding to a plurality of print head are located at one position on a test pattern, the conveying amounts may be adjusted for the position, and the nozzles to be used in the print heads may not be restricted. Having described that a so-called image scanner, either integrated or separated, is used according to this embodiment, this is not applied as a reading apparatus. The direct sensor 402, as described above, can be used to dynamically read and process a recorded material. An area sensor such as a digital camera and a smart phone may be used. In any case, an apparatus may be used which can read a density difference or a width in the neighborhood of an overlapping position between bands on a test pattern.

According to this embodiment, on read data obtained by reading a test pattern, a difference value between pixel values may be evaluated, and a position where the sign change of the difference value stops is determined as a position where streak becomes less remarkable to determine a conveying amount proper for a print head. However, the method for evaluating the difference value is not limited thereto. For example, on read data after the smoothing processing, it may be determined that streak becomes less remarkable in a case where an absolute value of a pixel value is equal to or lower than a predetermined value or in a case where a distance between a position having a positive pixel value and a position having a negative pixel value is equal to or lower than a predetermined distance. This may be changed as required in accordance with the size of the conveying amount step δ or the resolution of the scanner. The processing according to this embodiment prints test patterns by gradually reducing the conveying amount between scans and evaluates overlap portions in order from the test pattern with the largest conveying amount. However, the processing method is not limited thereto. The order of sizes of the conveying amount between scans is not limited thereto, but it may be any order if conveying amounts proper for print heads can be determined.

Having described the printer having two printing units of the print head 101L and the print head 101R, for example, according to this embodiment, embodiments of the present disclosure are applicable to any configurations including a plurality of printing units or to any apparatus including three or more printing units. In this case, conveying amounts proper for the printing units may be obtained, and the smallest conveying amount may be determined as a conveying amount for image printing. For a region printed by a printing unit corresponding to a conveying amount larger than the determined conveying amount, a nozzle or nozzles to be used may be controlled or the thinning processing may be performed on data equivalent to an overlapping width between bands in order to prevent black streak caused by an excessively small conveying amount from being much remarkable.

Second Embodiment

Figure 11A:
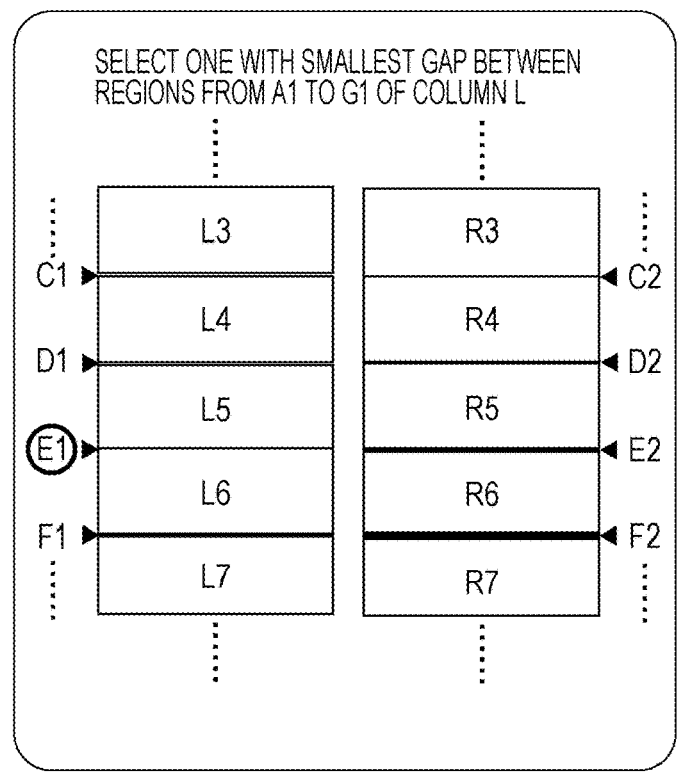
FIGS. 11A and 11B illustrate interfaces of a printer according to one or more aspects of the present disclosure.
Figure 11B:
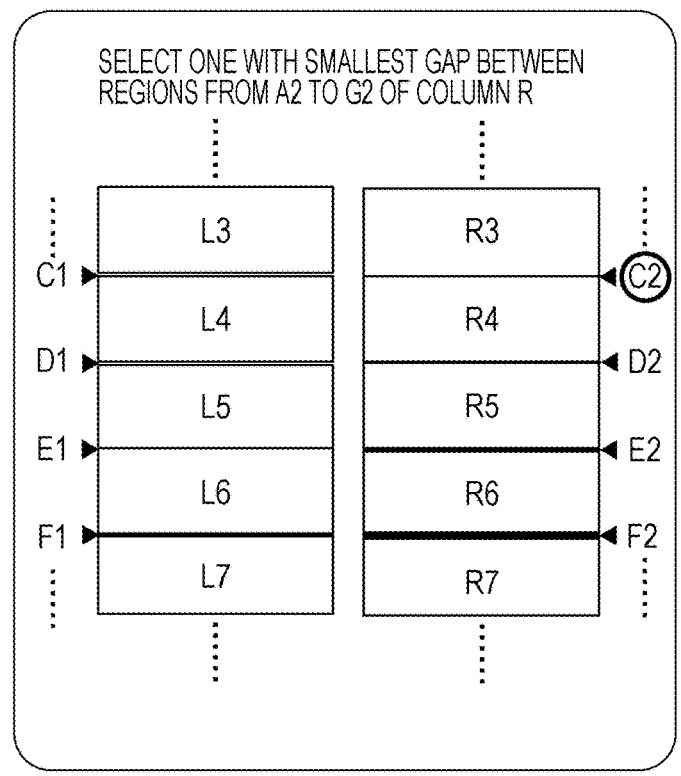

A second embodiment will be described with reference to FIG. 10. First, in step S1001, test patterns like the test patterns in FIG. 7 are printed. In the same manners as those of the first embodiment, the patterns may be printed and the conveying amount of a recording medium may be sequential changed. Here, a user designates a desired conveying amount and a nozzle to be restricted from being used with reference to the printed test patterns. While, according to the first embodiment, an appropriate conveying amount is determined based on read data, a user determines an overlapping position corresponding to an appropriate conveying amount according to this embodiment. A user, with reference to the printed test patterns, may determine a position where white streak becomes less remarkable on a pattern printed by the print head 101L and a position where white streak becomes less remarkable on a pattern printed by the print head 101R. Next, a user may use a user interface 518 in the printer 100 to input positions where white streak becomes less remarkable on the right and left patterns. Referring to the case in FIG. 7, the positions correspond to the position of the overlap portion E1 of the column the L (left pattern) and the position of the overlap portion C2 on the column R (right pattern). This will be described with reference to FIGS. 11A and 11B. FIG. 11A illustrates an example screen displayed on the user interface 518. According to this embodiment, the corresponding program can be implemented in the ROM 513 in the printer 100, and the screen can be displayed on the user interface 518. Alternatively, the corresponding program can be implemented in the host PC 500, and the screen can be displayed from the host PC 500 to the display device I/F 506. Alternatively, the screen may be displayed on a tablet PC on which a dedicated application runs. First, the screen displays "SELECT ONE WITH SMALLEST GAP BETWEEN REGIONS FROM POSITIONS A1 TO G1 OF COLUMN L." Then, a user may select and input "E1" as a position corresponding to the column L. Based on the display, the user may select and input a position "E1" as a position where white streak becomes less remarkable. Then, the input result from the user is stored in the ROM 513. Next, referring to FIG. 11B, the screen on the user interface 518 displays "SELECT ONE WITH SMALLEST GAP BETWEEN REGIONS FROM POSITIONS A2 TO G2 OF COLUMN R." Then, a user may select and input "C2" as a position corresponding to the column R. Also, the input result is stored in the ROM 513. As a result, a difference for two scans of the carriage system occurs between the column L and the column R. It is assumed here that the difference in conveying amount between regions is equal to 8, like the first embodiment, the conveying amount corresponding to the position E1 is d−δ, and the conveying amount corresponding to the position C2 is d+δ. Here, when printing is performed by adjusting the conveying amount for d−δ corresponding to the position E1, the conveying amount is proper for the print head 101L while being excessively small for the print head 101R. Thus, it can be estimated that regions may overlap by an amount equivalent to the width 26 on the bands printed by the scans. On the other hand, the use of the nozzle array corresponding to the width 28 may be restricted so that black streak due to such an overlap can be less remarkable. In step S1003, a nozzle or nozzles to be restricted from being used is or are be determined and is or are set in the ROM 513. The subsequent processing is the same as that of the first embodiment. In order to make black streak less remarkable, print data may be thinned out instead of restriction of a nozzle or nozzles to be used.

Even in a printing apparatus which does not have a reading unit such as the scanner as illustrated in FIG. 3, the conveying amount can be determined based on an input result from a user.

Third Embodiment

According to the aforementioned embodiments, so-called one-pass printing which prints regions of a test pattern by one scan is performed to test a displacement between serial two scans. However, so-called multipass printing may be performed which prints them by a plurality of scans. In this case, a displacement between two scans that are not serial is tested. In a case where N pass printing is performed which prints by N scans, the conveying amount after one scan with a nozzle width d is equal to d/N. In order to convey a recording material by d/N for N scans, the first roller may be rotated by d/NR [rad]. In this case, a read difference value from an adjoining pixel is evaluated within each region, and the conveying amount corresponding to a region with no change of the sign of the difference value may be determined as a conveying amount proper for the print head.

Figure 12A:
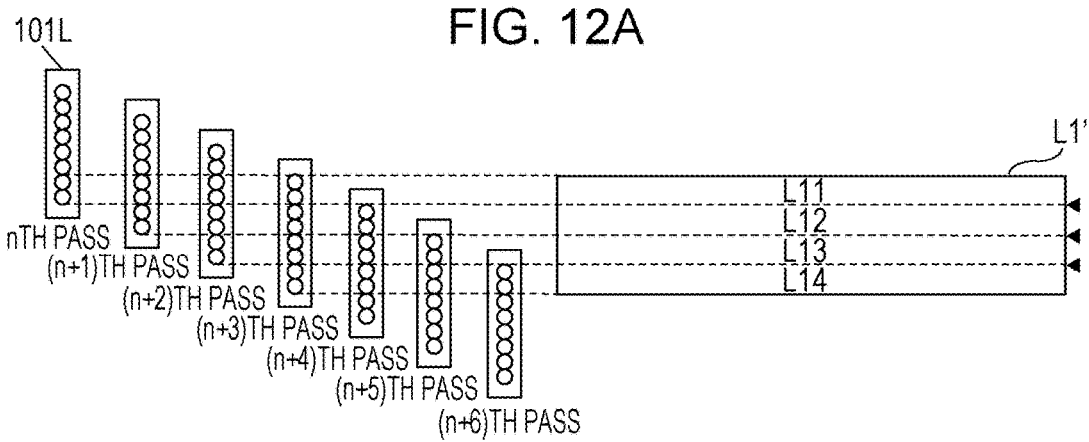
FIGS. 12A and 12B illustrate test patterns with multipass printing according to one or more aspects of the present disclosure.

FIG. 12A is an explanatory diagram of multipass printing. FIG. 12A illustrates 4 pass printing, for example, where one nozzle array of the print head 101L is illustrated for simplicity. A recording material is conveyed by a conveying amount of d/4 for a nozzle width d. One scan of the print head 101L and conveyance of a recording material by d/4 may be repeated intermittently so that regions L11 to L14 within a region L1' can be printed by four scans. FIG. 12A illustrates a case where a recording sheet 106 is to be conveyed by a proper conveying amount. A region L11 is printed by four scans from the nth pass to the (n+3)th pass, and a region L12 is printed by four scans from the (n+1)th pass to the (n+4)th pass. If the recording material is conveyed by an excessively large conveying amount, a gap may occur in a boundary portion between two scans that are not serial, that is, in a boundary portion between the nth pass and the (n+4)th pass in this example, and white streak occurs between the region L11 and the region L12. Ink is ejected to the gap part in the (n+1)th pass to the n+3th pass to print substantially by three scans. As a result, the lightness is not as high as the white streak between regions according to the first embodiment. If the recording material is conveyed by an excessively small conveying amount, the boundary is printed substantially by five scans. As a result, the lightness is lower than the other regions printed by four scans.

Figure 12B:
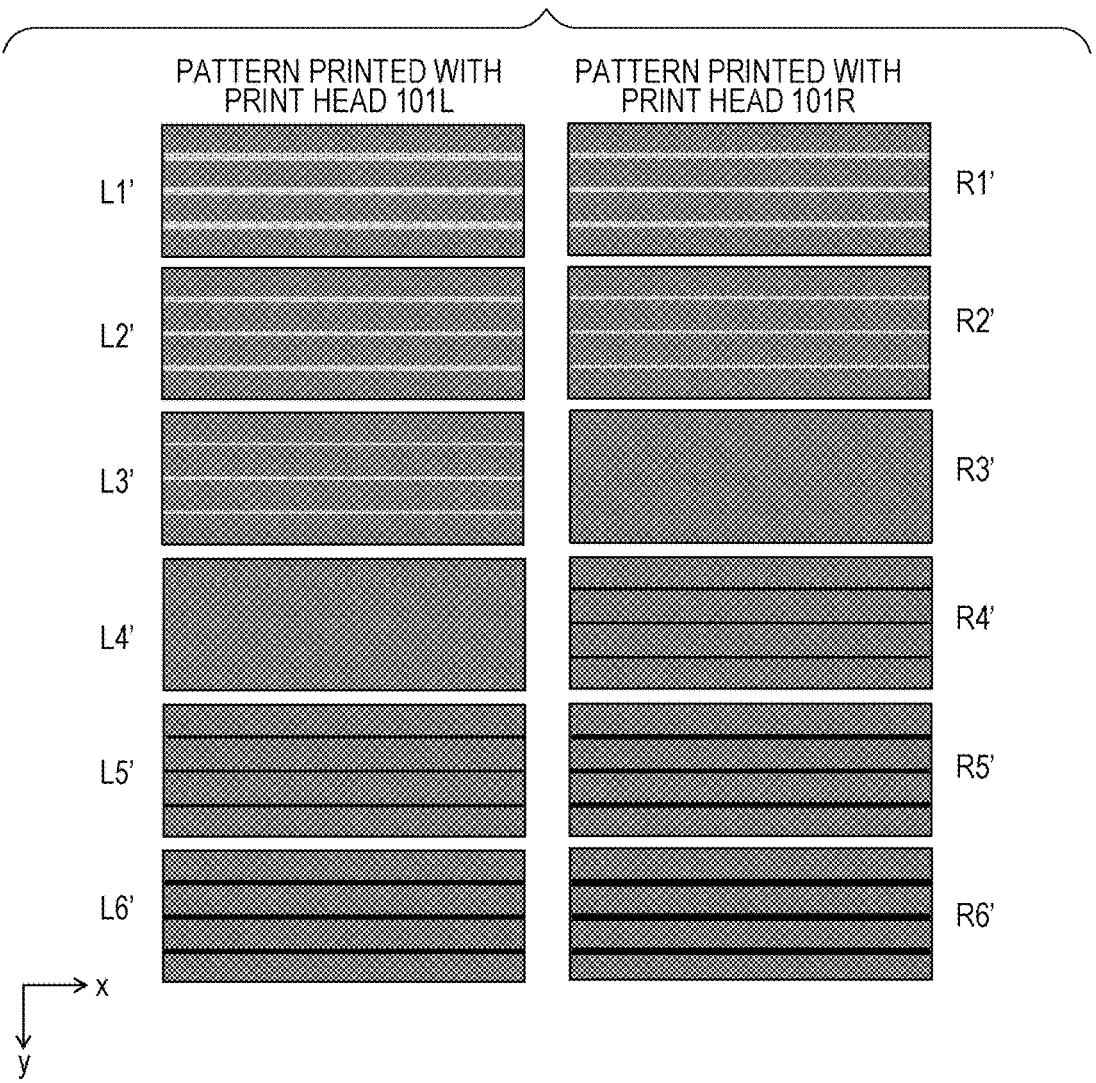

FIG. 12B illustrates test pattern examples according to this embodiment. In the illustrated test patterns, regions L1' to L6' are printed by using the print head 101L, and regions R1' to R6' are printed by using the print head 101R. Here, the conveying amount step is equal to δ. The regions L1' and R1' are printed by 4 pass printing such that the conveying amount of a recording material can be equal to (d/4)+2δ between scans. The conveying amount between scans on the regions L2' and R2' is equal to (d/4)+δ, and the conveying amount between scans on the regions L3' and R3' is equal to d/4. The conveying amount between scans on the regions L4' and R4' is equal to (d/4)−δ, the conveying amount between scans on the regions L5' and R5' is equal to (d/4)−2δ, and the conveying amount between scans on the regions L6' and R6' is equal to (d/4)−3δ. Here, a region with the least remarkable streak is determined in the column L and the column R. This may be determined by evaluating data read by using a reading unit such as a scanner like the first embodiment or may be selected visually by a user like the second embodiment. According to the illustrated example, the region L4 and the region R3 have the least remarkable streak. Therefore, a conveying amount of (d/4)−δ proper for the print head 101L and a conveying amount of d/4 proper for the print head 101R are obtained. The smaller conveying amount (d/4)−δ is determined as a conveying amount for printing an image in the printing apparatus according to this embodiment. Also, against black streak, for a head for which a larger conveying amount is proper, that is, for the print head 101R in the illustrated example, the processing for restringing a nozzle or nozzles to be used and processing for thinning out printed image data may be performed.

Also from test patterns printed by multipass printing, the conveying amount of a recording material can be determined which produces less remarkable streak in a printed image. General ink-jet printing apparatuses support printing in a plurality of modes such as 1-pass printing, 2-pass printing, and 4-pass printing. Therefore, the conveying amount of a recording material may be determined by printing test patterns in the modes.

With the aforementioned configurations, a printing apparatus which prints an image on a recording medium by using a plurality of print heads can obtain a proper conveying amount and can prevent occurrence of streak on a printed image between printing scans.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2017-035392 filed Feb. 27, 2017, which is hereby incorporated by reference herein in its entirety.

What is claimed is:

1. A printing apparatus comprising:
a conveying unit configured to convey a print medium in a conveying direction;
a conveying motor configured to drive the conveying unit;
a first printing unit having a plurality of printing elements for ejecting a predetermined color of ink, arranged in the conveying direction;
a second printing unit having a plurality of printing elements for ejecting the predetermined color of ink, arranged in the conveying direction;
a scanning unit configured to scan in a scanning direction intersecting the conveying direction, having the first and second printing units which are spaced apart by a predetermined distance in the scanning direction; and
a control unit configured to print an image on the print medium by performing an image forming operation and a conveying operation repetitively based on print data, wherein the image forming operation is an operation of forming an image on the print medium by ejecting ink from the first printing unit and the second printing unit while scanning the scanning unit in the scanning direction, and the conveying operation is an operation of intermittently conveying the print medium by the conveying unit;
a first pattern printing unit configured to perform, after a first forming operation of forming a test pattern on the print medium by ejecting the ink from the first printing unit by one scan, a first conveying operation of conveying the print medium by the conveying unit, and then perform a second forming operation of forming a test pattern on the print medium by ejecting the ink from the first printing unit by one scan, wherein the first pattern printing unit prints a plurality of first test patterns while making a drive amount of the conveying motor different from one to another when the first conveying operation is performed;
a first obtaining unit configured to, based on a first analysis result of the plurality of first test patterns printed by the first pattern printing unit, obtain a first drive amount of the conveying motor that is suited when an image is formed by the first printing unit;
a second pattern printing unit configured to perform, after a third forming operation of forming a test pattern on the print medium by ejecting the ink from the second printing unit by one scan, a second conveying operation of conveying the print medium by the conveying unit, and then perform a fourth forming operation of forming a test pattern on the print medium by ejecting the ink from the second printing unit by one scan, wherein the second pattern printing unit prints a plurality of second test patterns while making a drive amount of the conveying motor different from one to another when the second conveying operation is performed;
a second obtaining unit configured to, based on a second analysis result of the plurality of second test patterns printed by the second pattern printing unit, obtain a second drive amount of the conveying motor that is suited when an image is formed by the second printing unit; and
a determining unit configured to determine the first drive amount obtained by the first obtaining unit or the second drive amount obtained by the second obtaining unit, whichever is smaller, as the drive amount of the conveying motor used when an image is printed based on the print data by the control unit.

2. The printing apparatus according to claim 1,
wherein the first drive amount to be obtained by the first obtaining unit is a drive amount causing smallest white streak and smallest black streak in a boundary between two regions printed by two scans of the first forming operation and the second forming operation, and
wherein the second drive amount to be obtained by the second obtaining unit is a drive amount causing smallest white streak and smallest black streak in a boundary between two regions printed by two scans of the third forming operation and the fourth forming operation.

3. The printing apparatus according to claim 1, wherein the determining unit evaluates the first and second test pattern with respect to the plurality of conveying amount in increasing order and determine the first and second drive amount having an unremarkable gap between two regions on each of the first and second test pattern.

4. The printing apparatus according to claim 1,
wherein the first obtaining unit receives information indicating the first analysis result of the first test pattern from a user, and
wherein the second obtaining unit receives information indicating the second analysis result of the second test pattern from a user.

5. The printing apparatus according to claim 1,
wherein the first and second analysis results are signal values for each pixels, and
wherein the determining unit determines a drive amount having an unremarkable gap between two regions on the first test pattern based on a difference value between signal values between pixels adjacent to each other in the conveying direction as the first drive amount, and determines a drive amount having an unremarkable gap between two regions on the second test pattern based on a difference value between signal values between pixels adjacent to each other in the conveying direction as the second drive amount.

6. The printing apparatus according to claim 1, wherein the control unit stores in the storage unit the drive amount determined by the determining unit.

7. The printing apparatus according to claim 6, wherein the control unit determines which of the first drive amount and the second drive amount is larger, and
in a case where the first drive amount is determined to be larger, the control unit performs processing for reducing a printing amount for a part of a printing range by one scan of the first printing unit, and in a case where the second drive amount is determined to be larger, the control unit performs processing for reducing a printing amount for a part of a printing range by one scan of the second printing unit.

8. The printing apparatus according to claim 7, wherein the processing for reducing the printing amount by the control unit corresponds to processing for thinning out print data corresponding to the part.

9. The printing apparatus according to claim 1, further comprising a reading unit configured to read the first plurality of test patterns and the second plurality of test patterns.

10. The printing apparatus according to claim 1,
wherein the scan of the first forming operation and the scan of the second forming operation are serial two scans, and
wherein the scan of the third forming operation and the scan of the fourth forming operation are serial two scans.

11. The printing apparatus according to claim 1, wherein the scan of the first forming operation and the scan of the second forming operation are two scans that are not serial, and wherein the scan of the third forming operation and the scan of the fourth forming operation are two scans that are not serial.

12. An adjusting method for a drive amount of a conveying motor used in a printing apparatus, the printing apparatus having a conveying unit configured to convey a print medium in a conveying direction; and a conveying motor configured to drive the conveying unit;

a first printing units having a plurality of printing elements for ejecting a predetermined color of ink, arranged in the conveying direction;

a second printing unit having a plurality of printing elements for ejecting the predetermined color of ink, arranged in the conveying direction;

a scanning unit configured to scan in a scanning direction intersecting the conveying direction, having the first and second printing units which are spaced apart by a predetermined distance in the scanning direction, a control unit configured to print an image on the print medium by performing an image forming operation and a conveying operation repetitively based on print data, wherein the image forming operation is an operation of forming an image on the print medium by ejecting ink from the first printing unit and the second printing unit while scanning the scanning unit in the scanning direction, and the conveying operation is an operation of intermittently conveying the print medium by the conveying unit;

the adjusting method comprising:

printing a plurality of first test patterns, by performing a first conveying operation of conveying the print medium by the conveying unit, after a first forming operation of forming a test pattern on the print medium by ejecting the ink from the first printing unit by one scan, and then performing a second forming operation of forming a test pattern on the print medium by ejecting the ink from the first printing unit by one scan, wherein the plurality of first test patterns are printed while making a drive amount of the conveying motor different from one to another when the first conveying operation is performed;

obtaining a first drive amount of the conveying motor that is suited when an image is formed by the first printing unit, based on a first analysis result of the plurality of first test patterns;

printing a plurality of second test patterns, by performing a second conveying operation of conveying the print medium by the conveying unit, after a third forming operation of forming a test pattern on the print medium by ejecting the ink from the second printing unit by one scan, and then performing a fourth forming operation of forming a test pattern on the print medium by ejecting the ink from the second printing unit by one scan, wherein the plurality of second test patterns are printed while making a drive amount of the conveying motor different from one to another when the second conveying operation is performed;

obtaining a second drive amount of the conveying motor that is suited when an image is formed by the second printing unit, based on a second analysis result of the plurality of second test patterns;

determining the first drive amount obtained by the first obtaining unit or the second drive amount obtained by the second obtaining unit, whichever is smaller, as the drive amount of the conveying motor used when an image is printed based on the print data by the control unit.

13. The adjusting method according to claim 12, wherein the printing apparatus has a storage unit, and wherein the adjusting method further comprises storing in the storage unit the drive amount determined by the determining.

* * * * *